US008551350B2

(12) United States Patent
Miyata

(10) Patent No.: US 8,551,350 B2
(45) Date of Patent: Oct. 8, 2013

(54) METHOD OF MANUFACTURING LIQUID CRYSTAL DISPLAY DEVICE

(75) Inventor: Sumio Miyata, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 143 days.

(21) Appl. No.: 13/155,674

(22) Filed: Jun. 8, 2011

(65) Prior Publication Data

US 2011/0297645 A1 Dec. 8, 2011

(30) Foreign Application Priority Data

Jun. 8, 2010 (JP) ................................ 2010-131497

(51) Int. Cl.
*C30B 33/00* (2006.01)
*B44C 1/22* (2006.01)

(52) U.S. Cl.
USPC .................................. 216/23; 216/88; 216/89

(58) Field of Classification Search
CPC ......................... H01L 27/1214; H01L 21/3212
USPC .............................................. 216/23, 88, 89
See application file for complete search history.

(56) References Cited

U.S. PATENT DOCUMENTS

| 2004/0105065 | A1* | 6/2004 | Jung et al. | 349/153 |
|---|---|---|---|---|
| 2005/0030471 | A1* | 2/2005 | Liou | 349/190 |
| 2010/0259707 | A1* | 10/2010 | Iwata et al. | 349/73 |

FOREIGN PATENT DOCUMENTS

| JP | 4-199130 | 7/1992 |
|---|---|---|
| JP | 2008-216780 | 9/2008 |
| JP | 2009-42363 | 2/2009 |
| JP | 2009-251155 | 10/2009 |

OTHER PUBLICATIONS

Japanese Notification of Reason for Refusal issued Apr. 17, 2012, in Japan Patent Applicatin No. 2010-131497 (English translation only).
U.S. Appl. No. 13/155,653, filed Jun. 8, 2011, Miyata.

* cited by examiner

*Primary Examiner* — Shamim Ahmed
(74) *Attorney, Agent, or Firm* — Oblon, Spivak, McClelland, Maier & Neustadt, L.L.P.

(57) ABSTRACT

In one embodiment, a first substrate having a plurality of array regions is prepared. A seal material is formed in each of the array regions. A peripheral seal material is arranged outside the array regions extending in a first direction. The peripheral seal material has an exhaust opening provided at a portion of the peripheral seal material extending in a second direction. A dummy seal material is formed between the peripheral seal material extending in the first direction and the seal material formed in the array region. A second substrate is arranged on a surface of the first substrate in a jig. The inside of the jig is decompressed, and the atmosphere between the first and second substrates is exhausted while applying a pressure to the first and second substrates. Then, the first and second substrates are attached by curing the seal material, the peripheral seal material and the dummy seal material.

14 Claims, 6 Drawing Sheets

METHOD OF MANUFACTURING LIQUID CRYSTAL DISPLAY DEVICE

CROSS-REFERENCE TO RELATED APPLICATION

This application is based upon and claims the benefit of priority from Japanese Patent Application No. 2010-131497, filed Jun. 8, 2010, the entire contents of which are incorporated herein by reference.

FIELD

Embodiments described herein relate generally to a method of manufacturing a liquid crystal display device.

BACKGROUND

Liquid crystal display devices are widely used as display devices for various kinds of equipments such as personal computers, OA equipments, and TV sets because the liquid crystal display devices have many advantages such as lightness, compactness and low power consumption. In recent years, the liquid crystal display device has also been used in mobile terminal equipments such as a mobile phone, a car navigation device and a game player.

In recent years, One Drop Fill (ODF) method is put in practical use as one of techniques of forming a liquid crystal display panel. Moreover, a technique of polishing the surface of a substrate is also applied responding to the request for a slim down.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
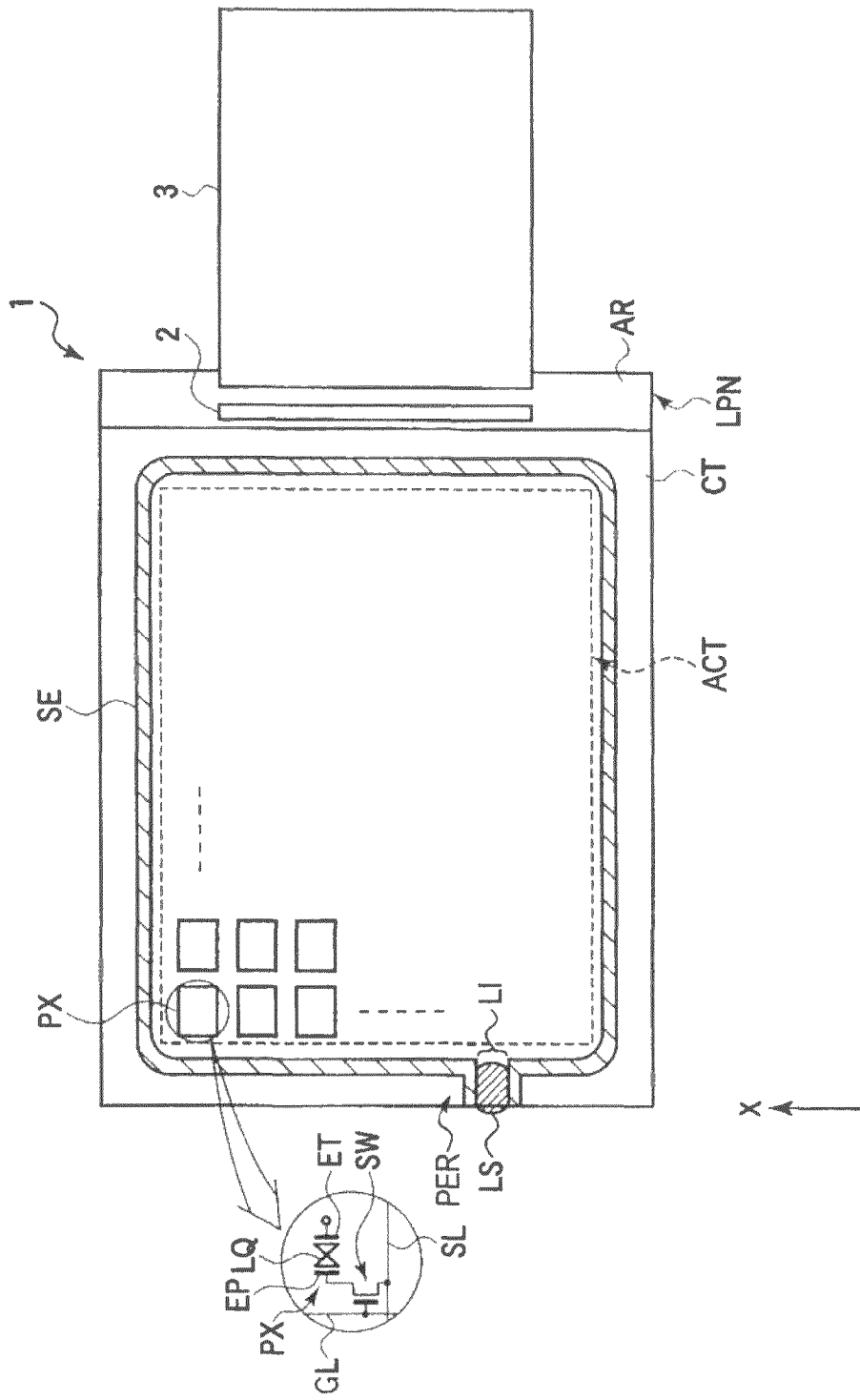
FIG. 1 is a plan view schematically showing a structure of a liquid crystal display device according to one embodiment.

A method of manufacturing a liquid crystal display device according to an exemplary embodiment of the present invention will now be described with reference to the accompanying drawings wherein the same or like reference numerals designate the same or corresponding portions throughout the several views.

According to one embodiment, a method of manufacturing a liquid crystal display device includes the steps of preparing a first substrate having a plurality of array regions arranged in a first direction and a second direction orthogonally crossing the first direction; forming a seal material in each of the array regions on the first substrate; forming a peripheral seal material arranged outside the array regions and extending in the first and second directions, the peripheral seal material having an exhaust opening provided at a portion of the peripheral seal material extending in the second direction on the first substrate; forming a dummy seal material between the peripheral seal material extending in the first direction and the seal material formed in the array region; arranging a second substrate on a surface of the first substrate in which the seal material is formed, in a jig; decompressing the inside of the jig; exhausting atmosphere between the first and second substrates in the jig while applying a pressure to the first and second substrates; and attaching the first and second substrates by curing the seal material, the peripheral seal material and the dummy seal material.

FIG. 1 is a plan view schematically showing the structure of a liquid crystal display device 1 according to one embodiment. The liquid crystal display device 1 includes an active-matrix type liquid crystal display panel LPN, a driver IC chip 2 and a flexible wiring substrate 3, etc. connected to the liquid crystal display panel LPN.

The liquid crystal display panel LPN includes an array substrate AR, a counter substrate CT facing the array substrate AR, and a liquid crystal layer held between the array substrate AR and counter substrate CT. The array substrate AR and counter substrate CT are formed of a glass substrate, respectively and are attached together by a seal material SE. The liquid crystal layer is held in a cell gap formed between the array substrate AR and counter substrate CT at the inner side surrounded by the seal material SE.

The liquid crystal display panel LPN includes an active area ACT of the shape of an approximately rectangle for displaying an image at the inner side surrounded by the seal material SE. The active area ACT is constituted by a plurality of pixels PX arranged in the shape of (m×n) matrix (here, m and n are positive integers). The driver IC chip 2 and flexible wiring substrate 3 are mounted on the array substrate AR in a peripheral area PER outside the active area ACT.

In this embodiment, the seal material SE is formed between the array substrate AR and counter substrate CT in the shape of an approximately rectangular frame so as to surround the active area ACT. Further, an injecting mouth LI for injecting liquid crystal material into the gap between the array substrate AR and counter substrate CT is formed in the seal material SE. In the illustrated example, the injecting mouth LI is formed at the opposite side to the side in which the driver IC chip 2, etc. are mounted through the active area ACT. The injecting mouth LI is sealed by a sealing material LS. However, One Drop Fill (ODF) method may be used to form the liquid crystal display panel in place of the injecting method.

The seal material SE is formed of at least one of a UV curing resin and a thermosetting resin. The seal material SE may be formed by a screen printing method or a drawing method using a dispenser device. The sealing material LS is also formed of the UV curing resin, for example.

The composition of each pixel PX is as follows, for example. The array substrate AR includes gate lines GL extending in a first direction X, source lines SL extending in a second direction Y that intersects at right angles with the first direction X, switching elements SW connected with the gate lines GL and source lines SL, picture electrodes EP connected with the switching element SW, etc. A counter electrode ET which counters the picture electrode EP through the liquid crystal layer LQ may be formed on the array substrate AR or the counter substrate CT.

In this embodiment, there is no restriction in particular with respect to the liquid crystal mode. The modes which mainly use vertical electric field, such as TN (Twisted Nematic) mode, OCB (Optically Compensated Bend) mode and VA (Vertical Aligned) mode, and the modes which mainly use lateral electric field, such as IPS (In-Plane Switching) mode and FFS (Fringe Field Switching) mode are applicable.

In the liquid crystal display panel LPN mentioned above, it is required to improve an attaching accuracy of the array substrate AR and counter substrate CT and to raise the uniformity of a cell gap. That is, regarding the attaching accuracy, when the array substrate AR and counter substrate CT are pasted together with a rotation shift of $\theta$ in the above-mentioned X-Y plane, display unevenness is generated, for example. Moreover, regarding the cell gap holding the liquid crystal layer LQ, when the cell gap is not uniform in the active area ACT, the display unevenness also occurs.

For example, in case the cell gap in the circumference near the seal material SE of the active area ACT becomes larger than the cell gap in the central portion of the active area ACT, the cell gap difference is sighted as a display unevenness. Otherwise, in the peripheral area PER of the active area ACT, the cell gap of some cells may become smaller than the cell gap in other cells (manufacturing misalignment), and the gap difference is also sighted as display unevenness.

Moreover, in the process of forming multiple patterns in which a plurality of liquid crystal display panels LPN are formed simultaneously using a large-sized mother substrate, a different cell gap from a design value may be formed in the liquid crystal display panel LPN formed along one end of the large mother substrate.

In this embodiment, a phenomenon in which a peripheral seal material (to be explained later) formed around the large-sized mother substrate is not uniformly crushed is reviewed as one of the causes of the fault, and an example of the technique for improving the fault is proposed.

Figure 2:
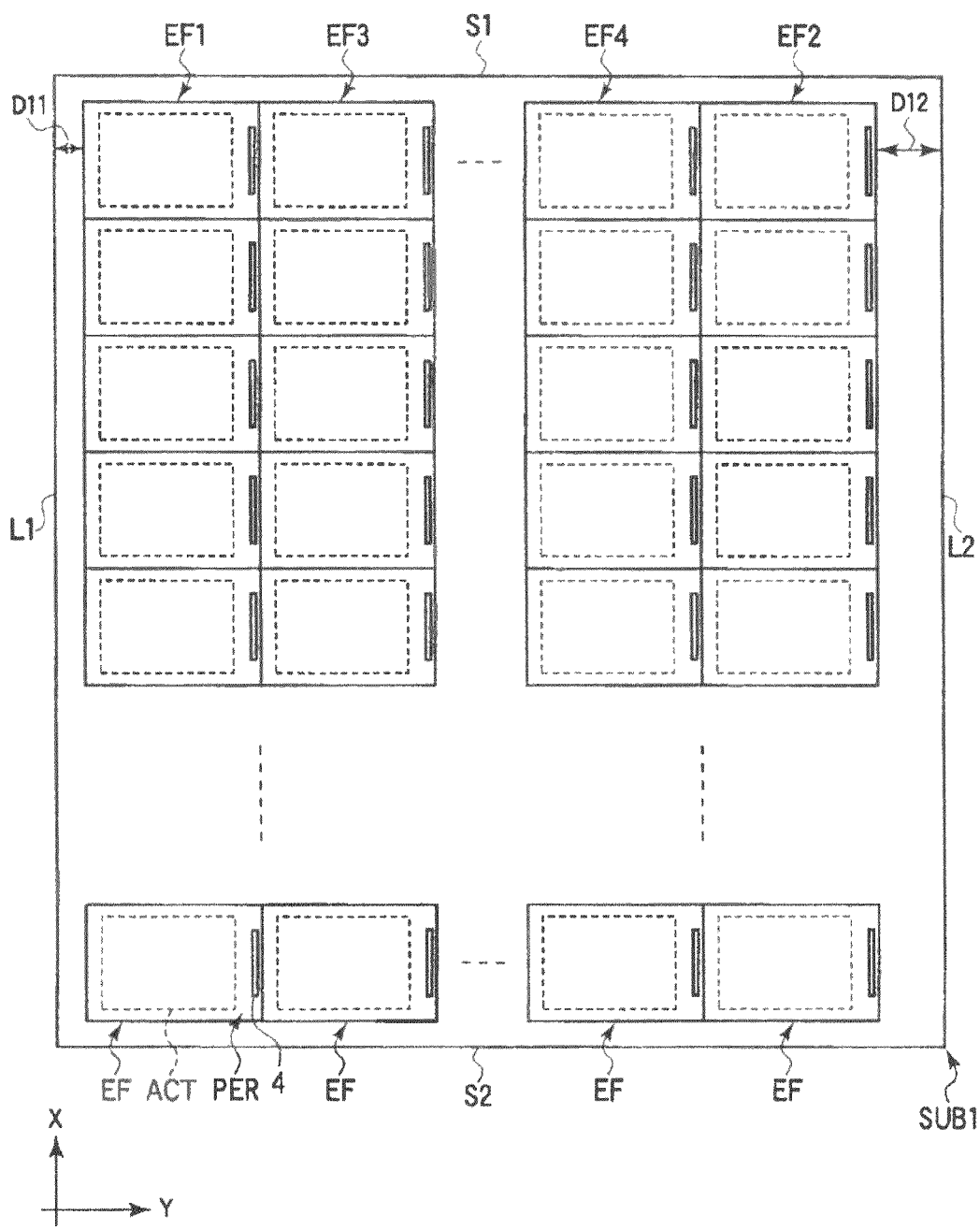
FIG. 2 is a figure for explaining a method of manufacturing a liquid crystal display panel according to the embodiment and is a plan view for explaining a process of preparing a first substrate specifically.

Hereinafter, the manufacturing method of the liquid crystal display panel LPN according to one embodiment is explained. FIG. 2 is a figure for explaining the manufacturing method of the liquid crystal display panel LPN according to this embodiment, and is a plan view for explaining a process of preparing a first substrate SUB1.

As illustrated, the first substrate SUB1 for forming a plurality of array substrates AR is prepared first. The first substrate SUB1 is a large-sized mother glass and includes a pair of long ends L1 and L2 extending in the first direction X and a pair of short ends S1 and S2 extending in the second direction Y.

In the first substrate SUB1, a plurality of array regions (or effective regions) EF for forming a plurality of array substrates AR is formed. The plurality of array regions EF are arranged in the X and Y directions, i.e., in the shape of a matrix. For example, 40-150 array regions EF are formed in the first substrate SUB1.

The array region EF includes a first array region EF1, a second array region EF2, a third array region EF3, and a fourth array region EF4. In the first substrate SUB1, the first array region EF1 is formed in a position adjacent to the long end L1. The second array region EF2 is formed in a position adjacent to the long end L2. The third array region EF3 adjoins the first array region EF1 in the second direction Y. The fourth array region EF4 adjoins the second array region EF2 in the second direction Y.

Especially, in the illustrated example, an interval D11 between the first array region EF1 and the long end L1 in the second direction Y is smaller than an interval D12 between the second array region EF2 and the long end L2 in the second direction Y.

A solid line in the figure showing the array region EF is a planned cutting line to cut the first substrate SUB1 into the individual array substrate AR. That is, each array region EF is an inner region surrounded by the planned cutting lines.

Each array region EF includes the active area ACT and the peripheral area PER. In each active area ACT, though detailed illustration is omitted, various insulating films, switching elements SW, picture electrodes EP, etc. are formed. A mounting portion 4 for mounting the driver IC chip 2, the flexible wiring substrate 3, etc. are formed in each peripheral area PER. In each array region, the active area ACT is located in the long end L1 side, and the mounting portion 4 is located in the long end L2 side.

Although not illustrated, a second substrate SUB2 for forming the counter substrate CT is prepared. The second substrate SUB2 is formed by the large-sized glass substrate with an approximately same size as the second substrate SUB1.

Figure 3:
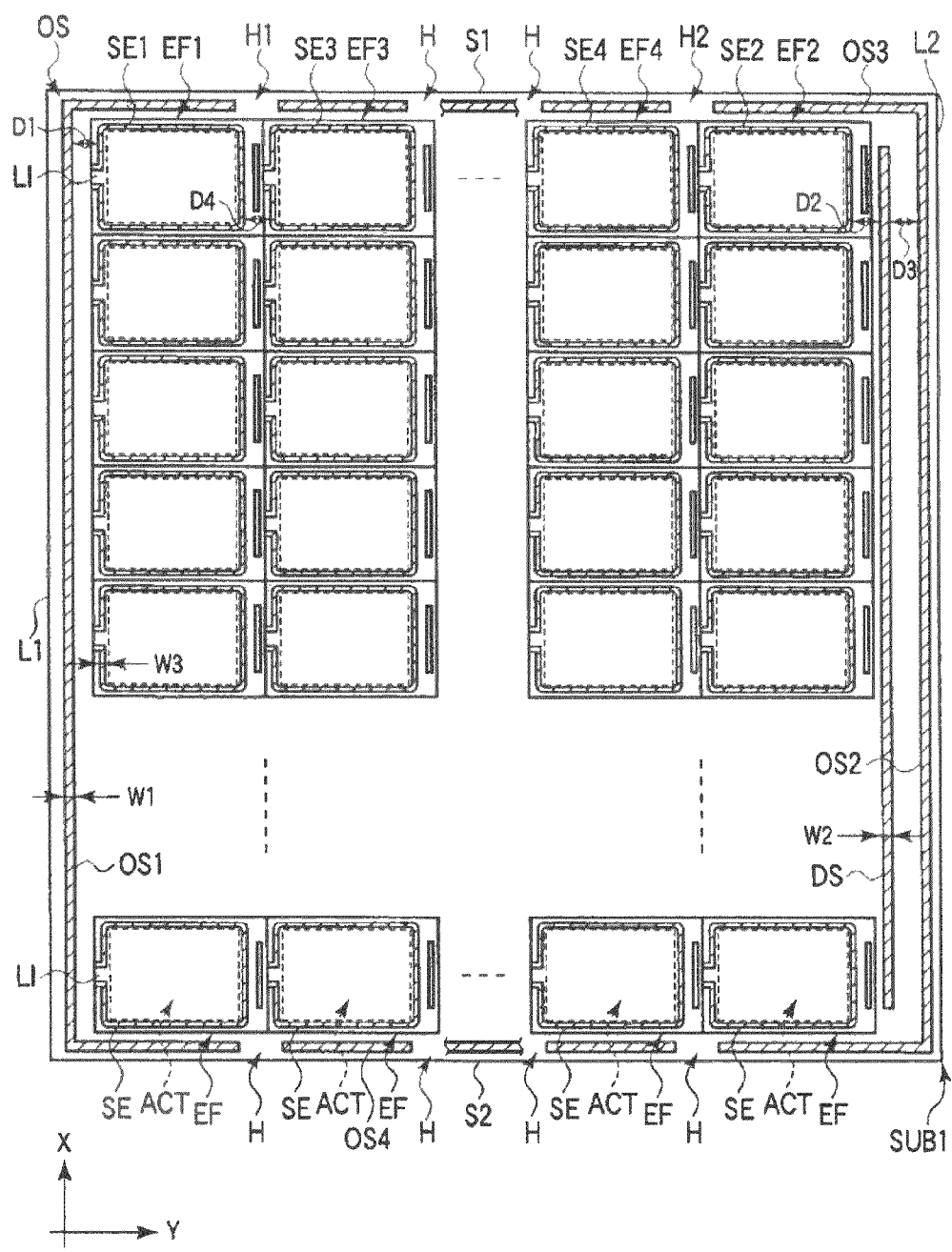
FIG. 3 is a figure for explaining the method of manufacturing the liquid crystal display panel according to the embodiment and is a plan view for explaining a process of forming a seal material, a peripheral seal material, and a dummy seal material.

FIG. 3 is a figure for explaining a manufacturing method of the liquid crystal display panel LPN according to this embodiment and is a plan view for explaining a process for forming the seal material SE, the peripheral seal material OS, and the dummy seal material DS.

As illustrated, the seal material SE is formed on the first substrate SUB1 so as to surround the active area ACT in each of the array regions EF. The peripheral seal material OS is formed outside of all the array regions EF, and the dummy seal material DS is further formed between the peripheral seal material OS and the array region EF.

Each seal material SE is apart from other seal materials SE which adjoin each other in the first direction X while being apart from other seal materials SE which adjoin each other in the second direction Y. Space formed between the seal materials SE in each of the two array regions EF which adjoin in the second direction Y extends in the first direction X.

In the illustrated example, each seal material SE is formed in the shape of an approximately rectangular frame. The seal material SE includes a first seal material SE1 formed in the first array region EF1, a second seal material SE2 formed in the second array region EF2, a third seal material SE3 formed in the third array region EF3, and a fourth seal material SE4 formed in the fourth array region EF4.

The third seal material SE3 is apart from the first seal material SE1. Between the first seal material SE1 and third seal material SE3, the mounting portion 4 formed in the first array region EF1 is located. The space formed between the first seal material SE1 and the third seal material SE3 extends in the first direction X.

Similarly, the fourth seal material SE4 is apart from the second seal material SE2. Between the second seal material SE2 and the fourth seal material SE, the mounting portion 4 formed in the fourth array region EF4 is located. The space formed between the second seal material SE2 and the fourth seal material SE4 extends in the first direction X.

Moreover, the injecting mouth LI is formed in the seal material SE formed in each array region EF. The injecting mouths LI are respectively formed at the opposite side to the mounting portion 4 in each array region EF, for example. In the illustrated example, each liquid crystal injecting mouth LI formed in the first to fourth seal materials SE1 to SE4 faces the long end L1 side of the first substrate SUB1.

The peripheral seal material OS is arranged between the array region EF and the long ends L1 and L2 of the first substrate SUB1, and between the array region EF and the short ends S1 and S2 of the first substrate SUB1. Namely, the peripheral seal material OS is composed of a first straight line portion OS1 and a second straight line portion OS2 extending in the first direction X, and a third straight line portion OS3 and a fourth straight line portion OS4 extending in the second direction Y. The peripheral seal material OS is apart from any seal materials SE containing the first to fourth seal materials SE1 to SE4.

At least one exhaust opening H is formed in the peripheral seal material OS. In the illustrated example, the peripheral seal material OS is formed approximately in the shape of a rectangular frame except for the exhaust opening H. Namely, each of the first straight line portion OS1 and second straight line portion OS2 extending along the long end L1 of the first substrate SUB1 continuously extends without breaking off on the way. On the contrast, each of the third straight line portion OS3 extending along the short end S1 and the fourth straight line portion OS4 extending along the short end S2 in the first substrate SUB1 discontinuously extends with breaking off on the way.

That is, the exhaust openings H correspond to the portion in which the peripheral seal material OS is partially missing, and are formed in each of the third straight line portion OS3 extending along the short end S1 and the fourth straight line portion OS4 extending along the short end S2 in the first substrate SUB1.

It is preferable that the exhaust opening H is formed so as to correspond to the space formed between adjoining seal materials SE. In the illustrated example, the exhaust opening H1 is formed corresponding to the space formed between the first seal material SE1 and third seal material SE3, for example. That is, the exhaust opening H1 is located on a line extending in the first direction X between the first seal material SE1 and third seal material SE3. Similarly, the exhaust opening H2 is formed corresponding to the space formed between the second seal material SE2 and fourth seal material SE4. That is, the exhaust opening H2 is located on a line extending in the first direction X between the second seal material SE2 and fourth seal material SE4.

Especially, in the illustrated example, the first straight line portion OS1 is formed in a position close to the seal material, for example, the first seal material SE1 formed in the first array region EF1, while the second straight line portion OS2 is formed in a position apart from the seal material, for example, the second seal material SE2 formed in the second array region EF2.

The dummy seal material DS is formed extending in the first direction X between the second straight line portion OS2 and the seal material adjacent to the second straight line portion OS2, for example, the second seal material SE2 formed in the second array region EF2.

The dummy seal material DS is formed approximately in a middle position between the second straight line portion OS2 and the second seal material SE2. Moreover, the dummy seal material DS is arranged in the position so that a distance D2 between the dummy seal material DS and the second seal material SE2 in the second direction Y becomes approximately the same as a distance D1 between the first straight line portion OS1 and the first seal material SE1 in the second direction Y.

According to this embodiment, a distance D3 between the second straight line portion OS2 and the dummy seal material DS in the second direction Y is further set to be approximately the same as the distance D1 (D1≈D2≈D3). Moreover, a distance D4 between the seal materials formed in each of the array regions which adjoin in the second direction Y, (for example, the distance between the first seal material SE1 of the first array region and the third seal material SE3 of the third array region EF3 in the second direction Y) is also approximately the same as the distance D1. (D1≈D4).

The line width W1 of the peripheral seal material OS and the line width W2 of the dummy seal material DS as mentioned-above, are approximately the same, and are larger than the line width W3 of the seal material SE. For example, while the line width W1 of the peripheral seal material OS and the line width W2 of the dummy seal material DS are about 2 mm-3 mm, the line width W3 of the seal material SE is equal or less than 1 mm, and the distances W3 is about 0.8 mm here.

The peripheral seal material OS and the dummy seal material DS are formed of the same material as the seal material SE, for example, at least one of a UV curing type resin and a heat thermosetting type resin. Moreover, the peripheral seal material OS and the dummy seal material DS may be formed with the seal material SE by a screen printing method or a drawing method by a dispenser.

Figure 4:
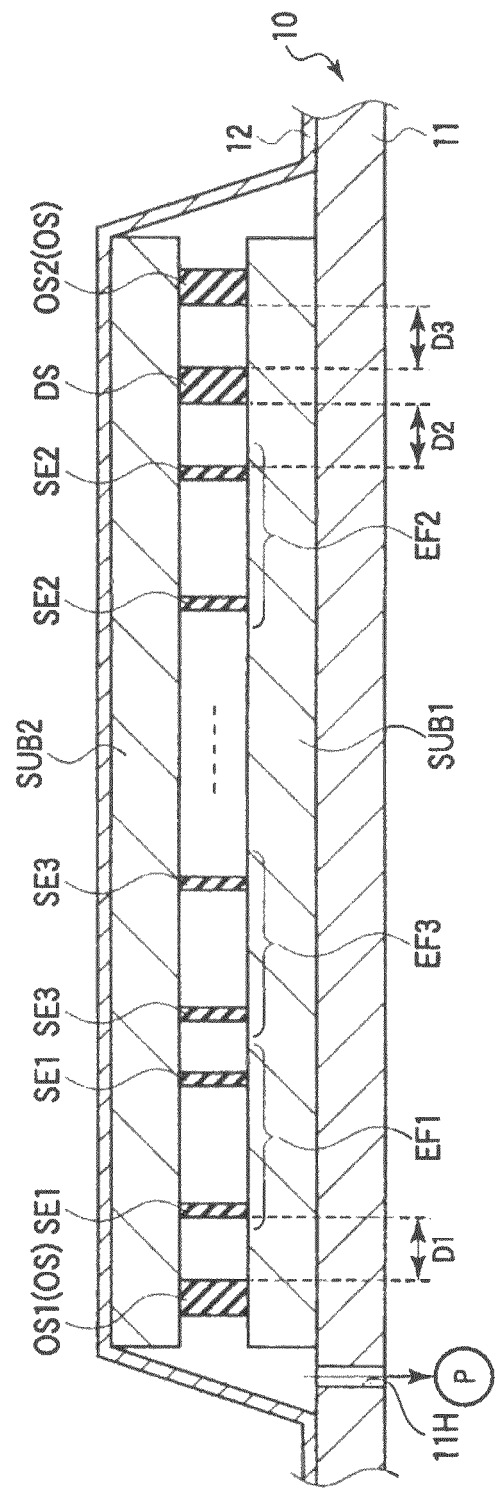
FIG. 4 is a figure for explaining the method of manufacturing the liquid crystal display panel according to the embodiment and is a cross-sectional view for explaining a process of applying a pressure to first and second substrates.

FIG. 4 is a figure for explaining the manufacturing method of the liquid crystal display panel LPN according to this embodiment, and is a cross-sectional view for explaining a process of applying a pressure to the first substrate SUB1 and second substrate SUB2.

As illustrated, a jig 10 for applying a pressure to the first and second substrates SUB1 and SUB2 includes a stage 11 and a sheet component 12 fixed to the stage 11. An exhaust opening 11H is formed in the stage 11, and a pump P for exhausting the inside of the jig 10 is connected. The sheet component 12 is formed by knitting carbon fiber in the sheet, for example.

The first substrate SUB1 is laid on the stage 11 of the jig 10 in the atmosphere, and the second substrate SUB2 is arranged on the side in which the seal material SE, etc. of the first substrate SUB1 are formed. That is, the second substrate SUB2 is arranged on each of the seal materials SE, the peripheral seal material OS, and the dummy seal material DS formed on the first substrate SUB1. Further, the sheet component 12 is arranged on the second substrate SUB2. That is, the first substrate SUB1 and second substrate SUB2 are held between the stage 11 and the sheet component 12.

Then, the first substrate SUB1 and second substrate SUB2 are pressurized so that a predetermined cell gap is formed between the first substrate SUB1 and second substrate SUB2 in each array region EF of the first substrate SUB1.

In this embodiment, the decompressed pressure value inside the jig 10 is set to about −70 KPa, and the vacuum environment is made. Under such environment, load is applied to the seal material SE, the peripheral seal material OS, and the dummy seal material DS by which the seal materials are crushed by sandwiching the first and second substrates SUB1 and SUB2 between the stage 11 and the sheet component 12.

Moreover, according to this embodiment, as mentioned-above, the peripheral seal material OS has the exhaust opening H. The exhaust opening H communicates the internal space surrounded by the peripheral seal material OS between the first substrate SUB1 and second substrate SUB2, that is, a region including a plurality of array regions EF with the exterior.

For this reason, when vacuuming of the inside of the jig 10 is carried out, the atmosphere inside the peripheral seal material OS is exhausted toward the exterior from the exhaust opening H formed in the peripheral seal material OS. That is, the space between the first substrate SUB1 and second substrate SUB2 surrounded by the peripheral seal material OS is decompressed like the internal environment of the jig 10. Thereby, the shortage of the load is improved.

However, if unbalance of flow velocity of the atmosphere exhausted from the exhaust opening H occurs, the pressure of the space between the first substrate SUB1 and second substrate SUB2 surrounded by the peripheral seal material OS becomes uneven, and the unevenness of the cell gap results because the seal material SE and peripheral seal material OS are crushed nonuniformly.

Then, according to this embodiment, the dummy seal material DS is arranged in the space surrounded by the peripheral seal material OS between the first substrate SUB1 and second substrate SUB2, and the flow velocity of the atmosphere exhausted from the exhaust opening H is controlled.

Generally, fluid is pulled in one side where a cross-sectional area is larger. In case the dummy seal material DS is not formed, the cross-sectional area of the space formed between the second straight line portion OS2 and the second seal material SE2 becomes larger than the cross-sectional area of the space formed between the first straight line portion OS1 and the first seal material SE1 because of the area for the mounting portion 4. For this reason, imbalance between the flow velocity of the atmosphere which flows between the second straight line portion OS2 and the second seal material SE2 to outside, and the flow velocity of the atmosphere which flows between the first straight line portion OS1 and the first seal material SE1 to outside is generated.

In case the dummy seal material DS is arranged between the second straight line portion OS2 and the second seal material SE2, the space formed between second straight line portion OS2 and the second seal material SE2 is divided into the space between the second straight line portion OS2 and dummy seal material DS, and the space between the second seal material SE2 and dummy seal material DS.

Furthermore, since the dummy seal material DS is located in the approximately middle position between the second straight line portion OS2 and the second seal material SE2, the cross-sectional area of two spaces divided by the dummy seal material DS becomes approximately the same. With this embodiment, especially since the dummy seal material DS is arranged so that the relation of the distance as described-above, i.e., D1≈D2≈D3, is accomplished, cross-sectional areas of the space between the second straight line portion OS2 and the dummy seal material DS and the space between the second seal material SE2 and the dummy seal material DS become approximately the same as that formed between the first straight line portion OS1 and the first seal material SE1.

Accordingly, the imbalance of the flow velocity of the atmosphere which flows from the exhaust opening H to outside can be canceled, and it becomes possible to equalize the pressure of the space between the first substrate SUB1 and second substrate SUB2 surrounded by the peripheral seal material OS. Thereby, the first substrate SUB1 and second substrate SUB2 are pressurized with sufficient pressure to crush uniformly the dummy seal material DS, the seal material SE, and the peripheral seal material OS.

Then, while a desired cell gap is formed between the first substrate SUB1 and second substrate SUB2, the first substrate SUB1 and second substrate SUB2 are pasted together by curing the seal material SE, the peripheral seal material OS, and the dummy seal material DS. The process to cure the seal material SE, the peripheral seal material OS, and the dummy seal material DS is performed by combining UV exposure and heating processes suitably. Moreover, such curing process may be performed inside the jig 10 or with other equipment different from the jig 10.

Figure 5:
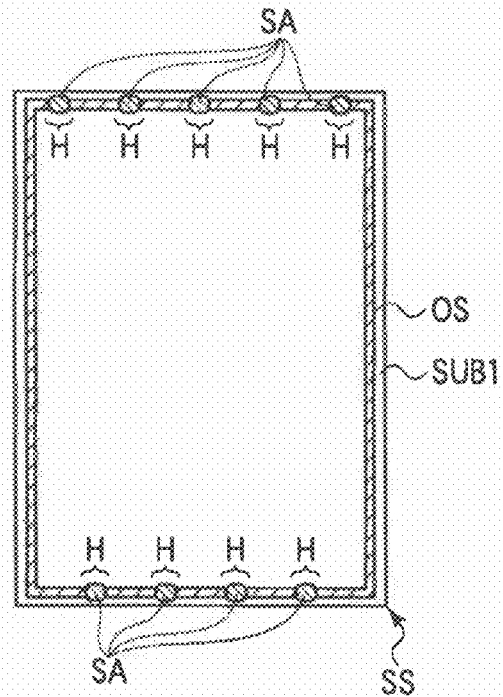
FIG. 5 is a figure for explaining the method of manufacturing the liquid crystal display panel according to the embodiment and is a plan view for explaining a process of polishing the first and second substrates.

FIG. 5 is a figure for explaining the manufacturing method of the liquid crystal display panel LPN according to this embodiment, and is a plan view for explaining a process of polishing the first substrate SUB1 and second substrate SUB2. In addition, the first substrate SUB1 side is illustrated here of a substrate set SS which is pasted together by the first substrate SUB1 and second substrate SUB2.

As illustrated, in the substrate set SS, the exhaust opening H of the peripheral seal material OS is sealed by a sealing agent SA. Then, each surface of the first substrate SUB1 and second substrate SUB2 which constitute the substrate set SS is polished. The polish processing is performed by at least one of chemical polishing and machine polishing.

In chemical polishing, the substrate set SS is put in solution, such as fluoric acid, for example, and the surfaces of the first substrate SUB1 and second substrate SUB2, i.e., the surfaces opposing the surfaces attached by the peripheral seal material OS are polished. Machine polishing is performed by cutting the surface of the first substrate SUB1 and second substrate SUB2 or grinding the surface using an abrading agent, for example.

Each glass substrate which constitutes the first substrate SUB1 and second substrate SUB2 is polished by such polishing process, and the first substrate SUB1 and second substrate SUB2 are made thin.

Figure 6:
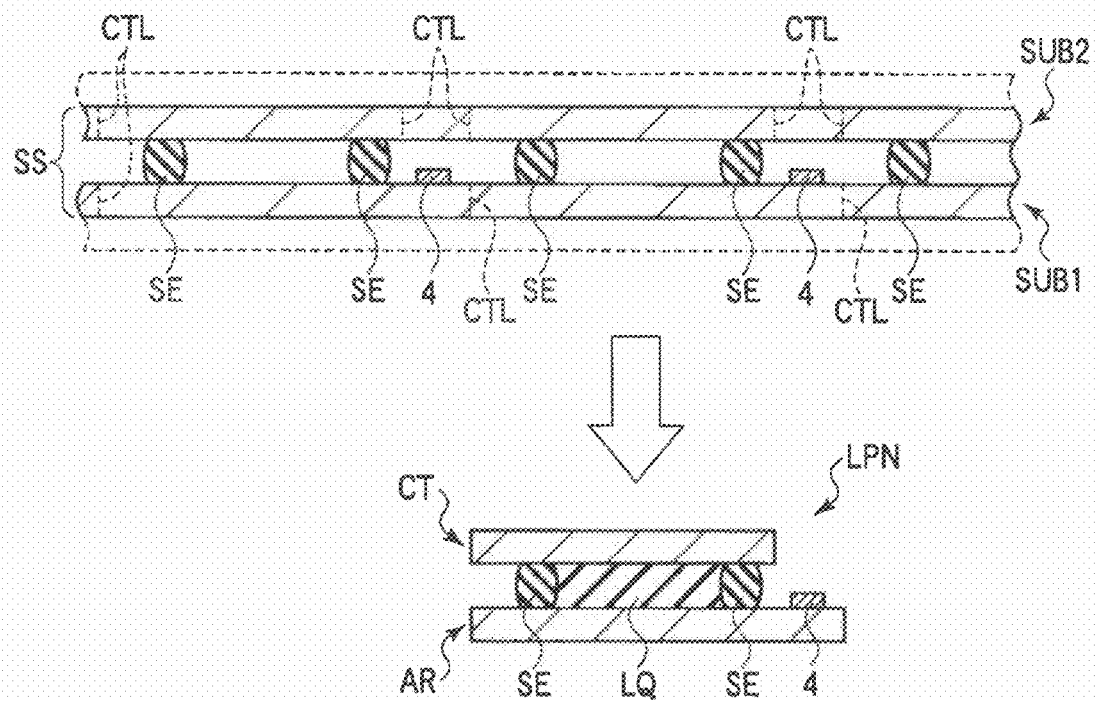
FIG. 6 is a figure for explaining the method of manufacturing the liquid crystal display panel according to the embodiment and is a cross-sectional view for explaining a process of cutting a substrate set into each liquid crystal display panel.

FIG. 6 is a figure for explaining the manufacturing method of the liquid crystal display panel LPN according to this embodiment, and is a sectional view for explaining the process of cutting the substrate set SS into the individual liquid crystal display panel LPN.

As illustrated, in the substrate set SS, each thickness of the first substrate SUB1 and second substrate SUB2 is made thin by the above-mentioned polishing process. First, in the substrate set SS, both of the first substrate SUB1 and second substrate SUB2 are cut along the planned line CTL extending in the first direction X, for example. Thereby, the substrate set SS is cut in the shape of a stripe in which a plurality of array regions EF formed in the first substrate SUB1 are connected with one column in the first direction X.

After injecting liquid crystal materials from each injecting mouth LI, each injecting mouth L1 is sealed with a sealing agent LS. Then, both of the first substrate SUB1 and second substrate SUB2 are cut along the planned lines CTL extending in the second direction Y. Thereby, the liquid crystal display panel LPN of a single piece in which the liquid crystal material is held between the array substrate AR and counter substrate CT is cut down.

Thus, in any of the liquid crystal display panels LPN cut from the substrate set SS, the uniform cell gap was formed and display unevenness was not seen.

Moreover, the exhaust opening H of the peripheral seal material OS is formed so as to correspond to the space formed between adjoining seal materials SE. For this reason, the atmosphere of the space between the first substrate SUB1 and second substrate SUB2 surrounded by the peripheral seal material OS passes along the space between the adjacent seal materials SE, and is promptly exhausted outside from the exhaust opening H.

Thereby, when pressurizing the first substrate SUB1 and second substrate SUB2, the pressure of the internal space between the first substrate SUB1 and second substrate SUB2 surrounded by the peripheral seal material OS is decompressed promptly, and it becomes possible to improve the shortage of load.

Moreover, since the seal material SE and peripheral seal material OS are formed of the same material, it becomes possible to form both seal materials using the same process. Moreover, as the technique of forming the seal material SE and peripheral seal material OS, either technique of screen-printing method or drawing method can be applied.

Moreover, in the process of polishing the first substrate SUB1 and second substrate SUB2, since the polishing is carried out after the exhaust opening H formed in the peripheral seal material OS is sealed by the sealing agent SA, the array region EF is held in an airtight state. Thereby, in the process of polishing the first substrate SUB1 and second substrate SUB2, either technique of chemical polishing and machine polishing is applicable.

Figure 7:
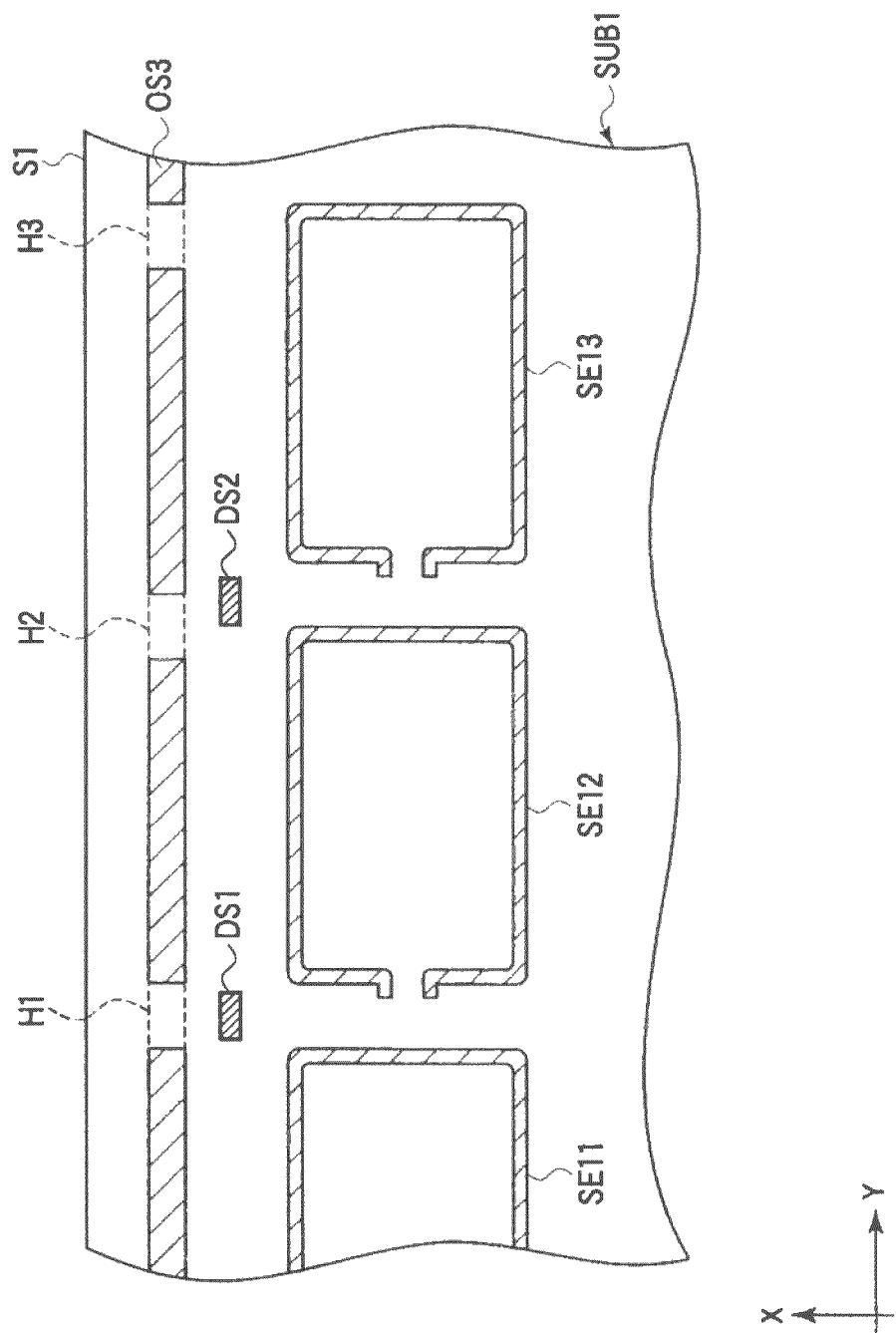
FIG. 7 is a figure for explaining the method of manufacturing the liquid crystal display panel according to the embodiment and is a plan view for explaining other layout of the seal material, the peripheral seal material, and the dummy seal material.

FIG. 7 is a figure for explaining the manufacturing method of the liquid crystal display panel LPN according to this embodiment, and is a plan view for explaining other layout of the seal material SE, the peripheral seal material OS, and the dummy seal material DS.

In the illustrated example, three exhaust openings H1, H2, and H3 are formed along the third straight line OS3 of the peripheral seal material OS and extending along the short end S1 of the first substrate SUB1, and three seal materials SE11, SE12, and SE13 are arranged in a line in the second direction Y. The exhaust opening H1 is formed in a position corresponding to the space formed between the two seal materials SE11 and SE12. A portion of the exhaust opening H2 faces the space formed between the two seal materials SE12 and SE13, and other portion are formed so as to face the seal material SE12. The exhaust opening H3 is formed so as to face the seal material SE13.

In such composition, the flow velocity of the atmosphere exhausted from the exhaust opening H3 becomes lower than the flow velocity of the atmosphere exhausted from the exhaust opening H1. Moreover, although the flow velocity of the atmosphere exhausted from the exhaust opening H2 becomes higher than the flow velocity of the atmosphere exhausted from the exhaust opening H3, it becomes lower than the flow velocity of the atmosphere exhausted from the exhaust opening H1. Thereby, the imbalance of the flow velocity as described-above occurs.

Therefore, in the example shown here, the dummy seal elements DS1 and DS2 to control the flow velocity are arranged so that the velocity is adjusted to the low-speed flow velocity.

That is, the dummy seal element DS1 is formed between the space formed between the seal materials SE11 and SE12 and the exhaust opening H1. The length in the second direction Y of the dummy seal element DS1 is shorter than the length of the exhaust opening H1 in the second direction Y. Such dummy seal element DS1 bars the atmospheric flow which goes to the exhaust opening H1 from the space formed between the seal material SE11 and SE12, and reduces the flow velocity.

Similarly, the dummy seal element DS2 is formed between the space formed between the seal materials SE12 and SE13 and the exhaust opening H2. The length in the second direction Y of the dummy seal element DS2 is shorter than the length of the exhaust opening H2 in the second direction Y. Such dummy seal element DS2 bars the atmospheric flow which goes to the exhaust opening H2 from the space formed between the seal material SE12 and SE13, and reduces the flow velocity.

Thereby, when the exhaust openings H1 to H3 are formed at equal intervals in the third straight line portion OS3 of the peripheral seal material OS, for example, even if the pitch of the seal materials SE11 to SE13 and the interval of the exhaust openings H1 to H3 formed along with the second direction Y are mismatched, the flow velocity of the atmosphere exhausted from the exhaust openings H1 to H3 can be controlled by providing the dummy seal elements DS1 and DS2. That is, the flow velocity from the exhaust openings H1 to H3 becomes approximately the same, and it becomes possible to suppress the generation of the fault resulting from the unbalance of the velocity as described-above.

In the above embodiment, while the injecting method is used to form the liquid crystal layer between the first and second substrates, One Drop Fill (ODF) method may be used in place of the injecting method. That is, a liquid crystal material is dropped in the array region surrounded by the seal materials. The first and second substrates are attached by curing the seal material, peripheral seal material and dummy seal material, and the first and second substrates is cut to form individual display panels.

As explained-above, according to this embodiment, a manufacturing process in which it becomes possible to improve the attaching accuracy of a pair of substrates, and to raise the evenness of the cell gap can be offered. Therefore, it is possible to manufacture a high quality liquid crystal display device with high manufacturing yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a liquid crystal display device, comprising the steps of:
preparing a first substrate having a plurality of array regions arranged adjacent to each other in a first direction and a second direction orthogonally crossing the first direction;
forming a seal material in each of the array regions on the first substrate;
forming a peripheral seal material arranged outside the array regions and extending along a periphery of the first substrate in the first and second directions, the peripheral seal material having an exhaust opening provided at a portion of the peripheral seal material extending in the second direction on the first substrate;
forming a dummy seal material outside the array regions between the peripheral seal material extending in the first direction and the seal material formed in the array region;
arranging a second substrate on a surface of the first substrate in which the seal material is formed, in a jig;
decompressing the inside of the jig;

exhausting atmosphere between the first and second substrates in the jig so as to apply a pressure to the first and second substrates; and attaching the first and second substrates by curing the seal material, the peripheral seal material and the dummy seal material.

2. The method of manufacturing a liquid crystal display device according to claim 1, wherein the steps of forming the seal material, the peripheral seal material, and the dummy seal material respectively include the steps of;

forming the peripheral seal material having a first line portion and a second line portion extending in the first direction, forming the seal material having a first seal material formed in a first array region adjacent to the first line portion and a second seal material formed in a second array region adjacent to the second line portion, and forming the dummy seal in an approximately middle position between the second line portion and the second seal material.

3. The method of manufacturing a liquid crystal display device according to claim 2, wherein a distance (D1) between the first line portion and the first seal material in the second direction is approximately the same as a distance (D2) between the dummy seal material and the second seal material in the second direction and a distance (D3) between the second line portion and the dummy seal material in the second direction.

4. The method of manufacturing a liquid crystal display device according to claim 3, wherein a distance (D4) between the seal materials respectively formed in the adjacent array regions in the second direction is approximately the same as the distance (D1).

5. The method of manufacturing a liquid crystal display device according to claim 1, wherein the step of forming the peripheral seal material includes a step of forming the exhaust opening at a position corresponding to a space formed between the adjacent seal materials in the second direction.

6. The method of manufacturing a liquid crystal display device according to claim 1, wherein the seal material, the peripheral seal material, and the dummy seal material are formed of the same material using at least one of a UV curing resin and a thermosetting resin.

7. The method of manufacturing a liquid crystal display device according to claim 1, wherein the seal material, the peripheral seal material, and the dummy seal material are formed using a screen printing method or a drawing method using a dispenser.

8. The method of manufacturing a liquid crystal display device according to claim 1, wherein a dummy seal element is arranged adjacent to the exhaust opening to control an exhaust velocity of atmosphere.

9. The method of manufacturing a liquid crystal display device according to claim 1, further comprising a step of polishing the surfaces of the first and second substrates after sealing the exhaust opening.

10. The method of manufacturing a liquid crystal display device according to claim 9, wherein the step of polishing the surfaces of the first and second substrates is performed by at least one of a chemical polishing method and a mechanical polishing method.

11. A method of manufacturing a liquid crystal display device, comprising the steps of:

preparing a first substrate having a plurality of array regions arranged adjacent to each other in a first direction and a second direction orthogonally crossing the first direction;

forming a seal material having an injecting mouth for injecting liquid crystal material in each of the array regions on the first substrate;

forming a peripheral seal material arranged outside the array region and extending along a periphery of the first substrate in the first and second directions, the peripheral seal material having an exhaust opening provided at a portion of the peripheral seal material extending in the second direction on the first substrate;

forming a dummy seal material outside the array regions between the peripheral seal material extending in the first direction and the seal material formed in the array region;

arranging a second substrate on a surface of the first substrate in which the seal material is formed on the surface, in a jig;

decompressing the inside of the jig;

exhausting atmosphere between the first and second substrates in the jig so as to apply a pressure to the first and second substrates;

attaching the first and second substrates to form a substrate set by curing the seal material, the peripheral seal material and the dummy seal material;

cutting the substrate set into display panel units each having a plurality of liquid crystal display panels; and injecting a liquid crystal material into the respective display panels through an injection mouth.

12. The method of manufacturing a liquid crystal display device according to claim 11, further comprising a step of polishing the surfaces of the first and second substrates after sealing the exhaust opening.

13. The method of manufacturing a liquid crystal display device according to claim 12, wherein the step of polishing the surfaces of the first and second substrates is performed by at least one of a chemical polishing method and a mechanical polishing method.

14. The method of manufacturing a liquid crystal display device according to claim 11, wherein the step of forming the peripheral seal material includes a step of forming the exhaust opening at a position corresponding to a space formed between the adjacent seal materials in the second direction.

* * * * *